E. R. KERR.
ROAD SCRAPER.
APPLICATION FILED JULY 29, 1911.
1,042,450.
Patented Oct. 29, 1912.
2 SHEETS—SHEET 1.
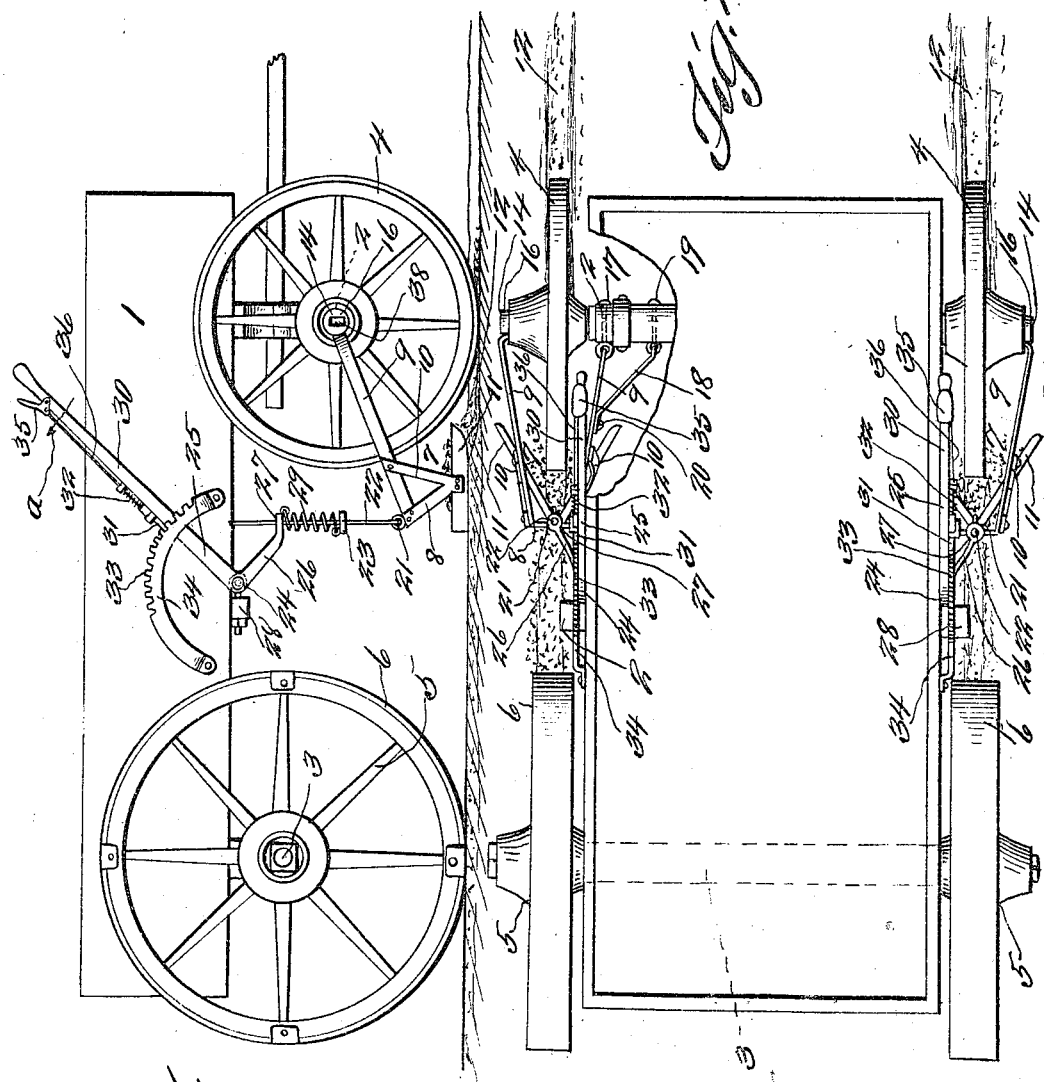
Witnesses
Francis G. Foxwell
P. Cot
Inventor
E. R. Kerr,
By L. Swift & Co.
Attorney

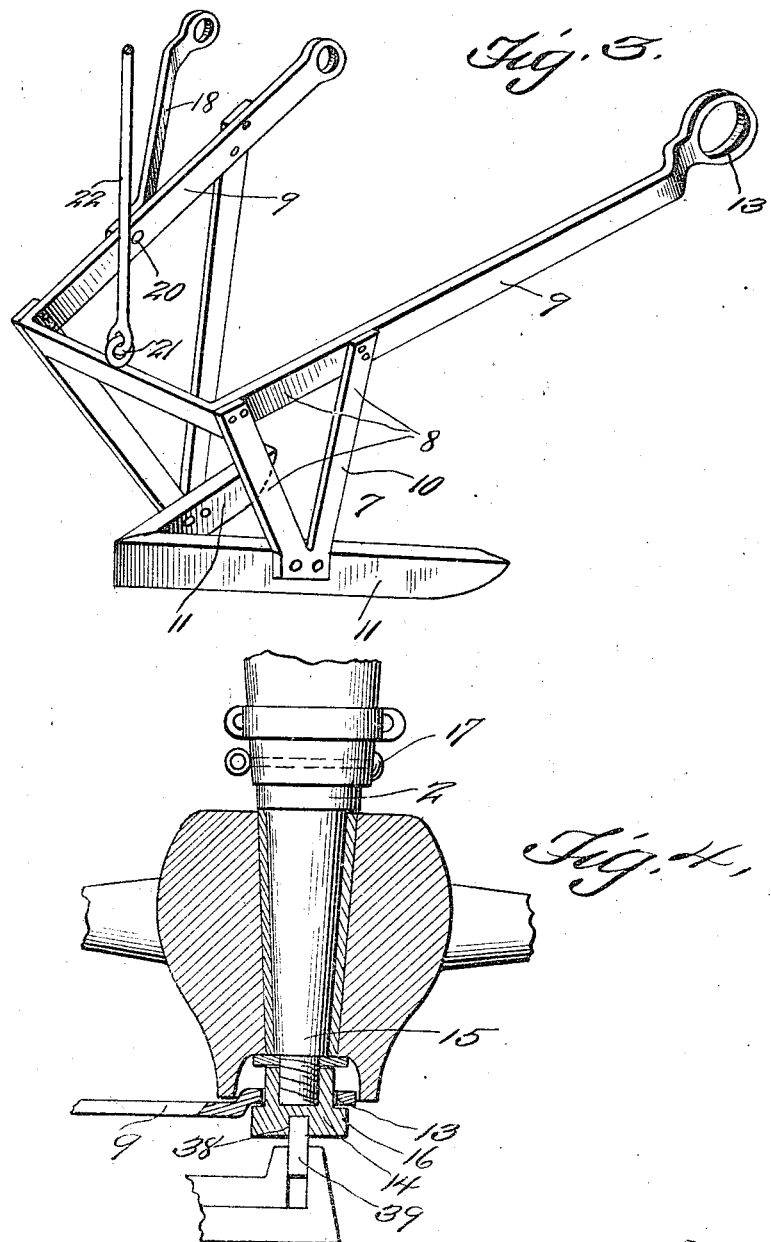

UNITED STATES PATENT OFFICE.

ELISHA R. KERR, OF ERIN, TENNESSEE.

ROAD-SCRAPER.

1,042,450.

Specification of Letters Patent.

Patented Oct. 29, 1912.

Application filed July 29, 1911. Serial No. 641,292.

*To all whom it may concern:*

Be it known that I, ELISHA R. KERR, a citizen of the United States, residing at Erin, in the county of Houston and State of Tennessee, have invented a new and useful Road-Scraper; and I do hereby declare the following to be a full, clear, and exact description of the invention, such as will enable others skilled in the art to which it appertains to make and use the same.

This invention relates to a new and useful road scraping and smoothing device adapted to be drawn over a wagon road, by attaching the same to an ordinary vehicle or to a vehicle especially designed for the purpose.

From constant use wagon roads are supplied with ruts and the like, and the primary object of the invention is to provide means for filling the ruts and the like, and generally smoothing the road.

The invention comprises further features and combination of parts, as hereinafter set forth, shown in the drawings and claimed.

In the drawings:—Figure 1 is a view in side elevation, showing the application of the improved road scraper, as applied to a portion of a vehicle. Fig. 2 is a plan view of the device. Fig. 3 is a view in perspective of the device detached, and the means for raising and lowering the same not shown. Fig. 4 is a detail sectional view showing the manner of connecting one portion of the device to the end of the spindle of the axle of the vehicle.

Referring more particularly to the drawings 1 designates the frame of the vehicle, having a front axle 2 and a rear axle 3. Journaled on the axles are the front and rear wheels 4 and 5. The rear wheels are provided with unusually wide tire rims 6, the purpose of which will hereinafter appear.

The scraper 7 comprises a frame 8 having the forwardly extending side bars 9, which arch about the front wheels, as shown in the drawings. Connecting between the side bars 9 and the frame 8 are the brace beams 10. At the lower portion of the frame 8 the scraper shoes 11 are provided, which are arranged angularly with relation to one another, as shown, so that as the vehicle is drawn over the road, the dirt on each side of the gulley or rut 12 in the road will be scraped into the rut. After the dirt is filled into the rut, the same is flattened, smoothed or otherwise acted upon by the extra wide rim tire 6 of the wheels 5. In this manner the road may be kept smooth. The outer side bars 9 terminate into eyes 13, which are offset slightly from the bodies of the bars, so as to extend into the hub of the wheels 4. To hold the rings in place nuts 14 are threaded to the spindles 15 of the front axle. The nuts 14 are provided with annular flanges 16, which prevent displacement of the eyes. The other bars 9 are connected to the front axle by means of the eye bolts 17. A brace bar 18 connects between the axle and two of the bars 9, by means of the eye bolts 19 and the bolts 20, in order to prevent side movement of the scraper device, relative to the wheels.

Pivoted at 21 to the frame 8 of the scraper is a rod 22 having a shoulder 23. Fulcrumed at 24 is a bell crank lever 25, the arm 26 of which terminates into an eye 27, which receives the upper end portion of the rod 22. The fulcrum of the lever is carried by a beam 28 of the frame of the vehicle. Connected to, and between the eye 27 and the collar 23, and surrounding the rod 22 is a coiled spring 29, of sufficient strength, to permit the scraper to be raised or lowered, as the vehicle moves forwardly, and yet having sufficient resiliency for holding the scraper yieldably in contact with the road bed. To raise or lower the scrapers the arm 30 is moved in one direction or the other. To hold the scrapers in raised or lowered positions, the arms 30 are provided dogs 31, which are spring tension, as shown at 32, designed to engage the notches 33 of the rack quadrant 34. The dogs 32 are manipulated by the hand grips 35 between which and the dogs connecting rods 36 are arranged.

As the vehicle is drawn forward over a road bed, the scrapers are lowered in the rear of the front wheels, and held yieldably in contact with the road bed, by means of the spring 29, and by the arrangement of the shoes 11, the dirt is scraped into the ruts, after which the extra wide rims of the wheels 5 smooth and pound the dirt in the ruts. After the ruts are properly filled the scrapers are raised by the manipulation of the levers 25 in the direction of the arrow *a*.

In order to turn the nuts 14 home, they are provided with recesses 38, for the reception of short metallic members 39, to which a wrench or the like (not shown) may be applied, thus providing means for turning the nuts on the spindles of the axles.

The invention having been set forth, what is claimed as new and useful is:—

In combination, a frame having an axle, wheels journaled on the spindles thereof, scraper frames suspended pivotally from the axle and the spindles, each scraper frame comprising rearwardly and downwardly partially converging bars having a transversely disposed bar integrally connecting them, the rearwardly and downwardly partially converging bars having triangular members connected thereto and extending downwardly, and scraper shoes, one secured to the lower apex of each member, these shoes being arranged angularly with relation to one another, and correspondingly like mechanisms on each side of the first frame for individually and independently raising and lowering each of the scraper frames.

ELISHA R. KERR.

Witnesses:
J. W. PRICE,
F. T. ARNOLD.